United States Patent [19]
Eberhardt

[11] 4,229,783
[45] Oct. 21, 1980

[54] BACKLIGHT FOR ELECTROOPTIC DISPLAY

[75] Inventor: Noel Eberhardt, Cupertino, Calif.

[73] Assignee: Timex Corporation, Waterbury, Conn.

[21] Appl. No.: 19,698

[22] Filed: Mar. 12, 1979

[51] Int. Cl.³ .................... F21V 1/06; G01D 11/28
[52] U.S. Cl. ........................... 362/352; 362/23; 362/333; 362/346; 350/345; 368/227; 368/234
[58] Field of Search ............ 362/351, 360, 352, 23, 362/26, 31, 32, 330, 332, 333, 346; 350/345; 58/50 R

[56] References Cited
U.S. PATENT DOCUMENTS

| 3,267,598 | 8/1966 | Olesen | 362/26 |
| 3,491,245 | 1/1970 | Hardesty | 362/26 |
| 3,864,905 | 2/1975 | Richardson | 58/50 R |
| 4,096,550 | 6/1978 | Boller | 350/345 |

Primary Examiner—Donald P. Walsh
Attorney, Agent, or Firm—William C. Crutcher

[57] ABSTRACT

A backlight for an electrooptic display, such as a liquid crystal display, serves to diffuse and distribute light from a point source, such as an incandescent bulb, over a broad, flat thin area providing backlighting for the display. The backlight employs a transparent light transmitting member with a slot or recess for the light source, wrapped in a thin transluscent sheet which covers both front and back surfaces and the edges to serve as a transflector.

3 Claims, 2 Drawing Figures

BACKLIGHT FOR ELECTROOPTIC DISPLAY

BACKGROUND OF THE INVENTION

This invention relates generally to a source of diffused illumination, and more particularly to a backlight for an electrooptic display. Diffused illumination devices have been used for many years to scatter and diffuse the light from a point source, such as a miniature incandescent bulb so as to illuminate dials at night or in dim light. These typically provide means to capture the light at the edge or at the end of a light transmitting member or a "light pipe" of transparent material such as glass or transparent plastic, and to guide the light and scatter and diffuse it with suitably disposed reflectors and light scattering elements. Illustrative of such devices are U.S. Pat. Nos. 3,043,038 issued July 10, 1962 to Marble, 3,043,947 issued July 10, 1962 to Albinger and 3,574,993 issued Apr. 13, 1971 to Black. These patents show light emanating from a point source, conducted through a light pipe, and scattered by irregularities at the face, with reflectors on the back surface. In addition, Marble and Black include transluscent sheets on the front face to diffuse the light.

Backlights have more recently been used for electrooptic displays, such as liquid crystal displays, which can operate both in a transmissive and reflective mode. Thus, the backlight may include an element designed to serve as a reflector of ambient light, as well as providing illumination for the display when ambient light is insufficient. Exemplary of such construction patents are U.S. Pat. No. 3,864,905 issued Feb. 11, 1975 to Richardson, British Pat. No. 1,417,958, U.S. Pat. No. 4,043,636 issued Aug. 23, 1977 to the applicant U.S. Pat. No. 4,118,111 to Laesser and pending application Ser. No. 935,187 filed Aug. 21, 1978 in the name of P. Hochstrate, assigned to applicant's assignee. Some of the patents mentioned above also suggest disposition of the point light source within the light transmitting member by embedding or inserting in a thickened end portion of the light guiding member.

The foregoing constructions all require special construction or manufacturing techniques in order to efficiently distribute light in the light transmitting member.

SUMMARY OF THE INVENTION

Briefly stated, the invention concerns an improved backlight for an electrooptic display comprising a flat light transmitting member having a backlight member disposed behind a passive light transmissive electrooptic display, the improvement in said backlight comprising a flat transparent light transmitting member having opposed first and second parallel surfaces and having edge portions, said light transmitting member defining a recess opening in at least one of said surfaces, a thin sheet of translucent material completely enveloping said light transmitting member covering said first and second srufaces and said edges and adhered thereto by an adhesive, and a light source disposed in said recess.

Accordingly, one object of the present invention is to provide an improved backlight of simple construction at lower cost.

Another object of the invention is to provide an improved backlight for an electrooptic display which provides even and uniform illumination of diffused light from a point source.

DRAWINGS

The invention, both as to organization and method of practice, together with further objects and advantages thereof, will best be understood by reference to the following specification, taken in conjunction with the accompanying drawings, in which:

FIG. 1 is an elevation drawing in cross section illustrating the improved backlight in its expected operating environment, and FIG. 2 is an "exploded" perspective drawing illustrating the method of construction.

DESCRIPTION OF THE PREFERRED EMBODIMENT

Figure 1:
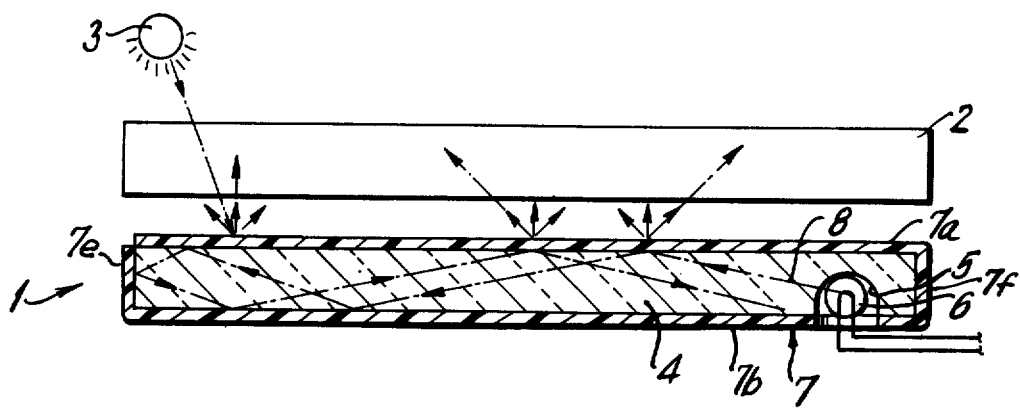

Referring now to FIG. 1 of the drawing, the improved backlight indicated by numeral 1 is disposed behind an electrooptic display 2. The electrooptic display is of the passive type and preferably is a liquid crystal display. A typical liquid crystal display is disclosed in U.S. Pat. No. 3,881,809 issued May 6, 1975 to Fergason. This liquid crystal display employs a backlight and is typical of many commercially available electro-optic displays. The display 2 is light transmissive and selectively activated indicia, such as digits or characters, are visible either when the display is transmitting light from an ambient light source indicated at 3 or when it is transmitting light from the backlight 1. Other than this, the precise nature of display 2 is not material to the present invention. Elements 1 and 2 may be stacked contiguously in a sandwich construction or separated from one another by spaces as shown.

Backlight 1 comprises a light transmitting member 4 of glass or transparent plastic having flat opposed surfaces and a minimum thickness. An oblong recess 5 provided near one edge thereof accomodates a light source such as a miniature incandescent lamp 6. In its preferred embodiment, the light transmitting member 4 is molded from clear acryllic plastic material so as to incorporate the oblong recess 5, and is of a thickness on the order of 0.08 inches (0.2 centimeters). Other suitable materials for the light transmitting member are transparent or substantially transparent polycarbonate, or polystyrene plastics. The thickness may vary considerably and still be effective, perhaps between 0.02 inches and 0.2 inches.

Light transmitting member 4 is compeltely enclosed by a thin sheet of transluscent material 7. The translucent material is preferably a thin foldable sheet of polypropylene or polystyrene, which is thin enough to permit the emission of light from the light transmitting member but thick enough to diffuse and scatter the light and also to act as a partial reflector or "transflector". In its preferred embodiment, the transluscent sheet comprises a single sheet of white polypropylene on the order of 0.0015 inches (0.004 centimeters) thick. It is important to note that sheet 7 completely encloses the transmitting member 4 covering the light transmitting member 4 covering the upper and lower surfaces as well as the intersecting edges of the light transmitting member.

Figure 2:
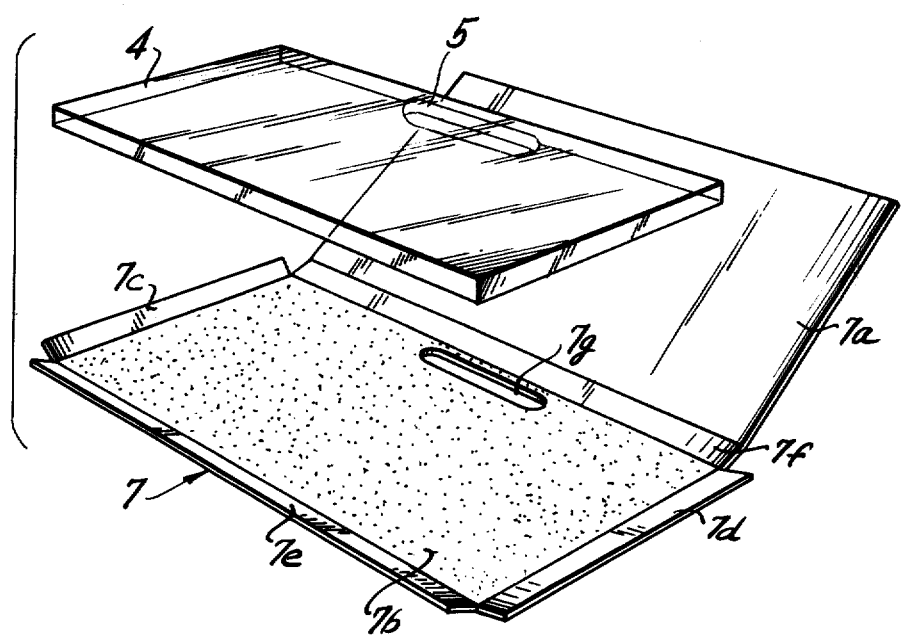

Reference to FIG. 2 illustrates the manufacture of the backlight. Both the front and rear covering surfaces 7a and 7b, as well as end tabs 7c, 7d and front and rear edge tabs 7e, 7f are all cut from a sheet of foldable polypropylene as should be apparent from the drawing. At the same time, a slot 7g is cut in the sheet to line up with oblong recess 5 in the light transmitting member 4 when the member is folded. One side of the transluscent sheet is coated with a water-clear transfer adhesive film commonly available as a commercial item from Morgan Adhesives Company, 3M Company and Dennison Label Company.

To assemble the backlight, it is only necessary to place the light transmitting member on the adhesive coated side 7b of the transluscent sheet and to fold over side 7a on the top surface and to fold up tabs 7c-7e to cover the edges. The assembly is then placed so that the incandescent lamp 6 nests within the recess 5.

OPERATION

Operation of the improved backlight is seen in FIG. 1. A ray 8 from lamp 6 traverses the light transmitting member and is reflected throughout the light transmitting member, as well as being returned by reflection from the end tab 7e. Light is dispersed and scattered at the interface between the light transmitting member and the transluscent sheet as indicated by the arrows. Light transmitted from the upper surface of the backlight evenly illuminates the display 2 from the lower side thereof.

When the backlight is not being used for illumination purposes at night, it serves as a reflector of ambient light from source 3. Ambient light reflects from top surface 7a of the transluscent sheet 7 which eliminates need for any additional reflector members.

Thus, there has been described a backlight which is extremely simple to construct and which also efficiently provides even and uniform illumination. Important to the efficient operation of the improved backlight is the use of transluscent sheet material on all surfaces of the light transmitting member, including the edges.

While there has been described herein the preferred embodiment of the invention, other modifications will soon occur to those skilled in the art and it is desired to encompass in the appended claims all such modifications as fall within the true spirit and scope of the invention.

I claim:

1. In an illuminated electrooptic display of the type having a backlight member disposed beneath a passive light transmissive electrooptic display, the improvement in said backlight comprising:

a flat substantially transparent light transmitting member having opposed first and second parallel surfaces and having edge portions, said light transmitting member defining a recess opening in at least one of said surfaces, a thin sheet of transluscent material completely enveloping said light transmitting member covering said first and second surfaces and said edges and adhered to by an adhesive, said transluscent material comprising a foldable sheet of material selected from the group consisting of polypropylene or polystyrene, and defining a hole adapted to be aligned with said recess when the sheet is folded to envelop the light transmitting member; and a light source disposed in said recess.

2. The combination according to claim 1, wherein said light transmitting member is selected from the group consisting of acrylic, polycarbonate or polystyrene plastics, and wherein said translucent sheet is comprised of white polypropylene material on the order of 0.0015 inches thick.

3. An improved backlight for an illuminated display of the type having a backlight disposed beneath a passive light transmissive electrooptic display, said improvement comprising:

a light transmitting member of clear plastic having upper and lower opposed flat surfaces with intersecting edges, and having an oblong recess formed in the lower surface along one of said edges;

a transluscent transflector sheet member completely enveloping the upper and lower surfaces and edges of said light transmitting member, said sheet member being formed from a single foldable sheet of white polypropylene having portions adapted to cover the first and second surfaces and having tab portions adapted to cover said edges, said sheet having a transparent adhesive film on one side; and an incandescent lamp member adapted to fit within said recess.

* * * * *